United States Patent [19]

Eke

[11] Patent Number: 4,598,689

[45] Date of Patent: Jul. 8, 1986

[54] OVEN SYSTEMS

[75] Inventor: Kenneth I. Eke, Sanderstead, England

[73] Assignee: Microwave Ovens Limited, Shirley, England

[21] Appl. No.: 695,531

[22] Filed: Jan. 28, 1985

[30] Foreign Application Priority Data

Feb. 2, 1984 [GB] United Kingdom ................. 8402757

[51] Int. Cl.[4] ................................................ A21B 1/00

[52] U.S. Cl. ............................... 126/21 A; 126/21 R; 219/10.55 R; 219/10.55 B; 219/400

[58] Field of Search ................ 126/21 A, 21 R, 15 A, 126/15 R, 1 AD, 1 B, 1 C, 1 D, 1 E, 273 R, 300, 290, 80; 219/10.55 R, 400, 10.55 B, 10.55 C, 10.55 F, 398, 10.55 M

[56] References Cited

U.S. PATENT DOCUMENTS

| | | | |
|---|---|---|---|
| 4,354,084 | 10/1982 | Husslein et al. | 126/21 A X |
| 4,369,347 | 1/1983 | Shin | 126/21 R X |
| 4,375,213 | 3/1983 | Kemp et al. | 126/21 A |
| 4,444,175 | 4/1984 | Reynolds | 126/21 R |

*Primary Examiner*—Larry Jones

*Attorney, Agent, or Firm*—Penrose Lucas Albright

[57] ABSTRACT

An oven system comprises a grill unit and a microwave oven unit built into a standard kitchen unit framework or other structure for receiving same with the grill unit surmounting the microwave oven unit. A duct extends from the rear of the microwave oven unit, upwardly past the rear of the grill unit, over the top of the grill unit to a front exit. The rear wall of the cavity of the microwave oven unit has a vent communicating with the duct, and the rear wall of the cavity of the grill unit has a vent communicating with the duct. The microwave oven unit has a magnetron cooled by a blower which directs a flow of air through the duct, this flow being capable of venting both cavities.

6 Claims, 6 Drawing Figures

OVEN SYSTEMS

DESCRIPTION

Field of the Invention

This invention relates to oven systems, and in particular such systems employing a microwave oven unit and a grill unit.

SUMMARY OF THE INVENTION

According to one aspect of the invention there is provided an oven system comprising a microwave oven unit having a first cavity and a grill unit having a second cavity, wherein a single blower or fan generates a flow of air which is capable of venting both cavities. Thus, when the oven system is switched on, the single blower or fan acts to vent both cavities so that if food is being cooked in either or both cavities moist air will be extracted. According to another aspect of the invention an oven system comprises a microwave oven unit having a first cavity, a microwave generator for supplying microwave power to the first cavity and thermal heating means for supplying thermal power to the first cavity, and a grill unit having a second cavity and a grill element for supplying thermal power to the second cavity, the microwave oven unit having a blower or fan capable of venting the first cavity, and duct means leading from the microwave oven unit, communicating with the second cavity and debouching to the surroundings, whereby the fan causes air to flow from the microwave oven unit and along the duct means so as to entrain air from the second cavity and thereby vent the latter.

The first cavity may be provided with venting means which are operative so as to cause the blower or fan to pass air through the first cavity (and thence into the duct means) whenever the system is switched on, providing the thermal heating means are unenergized. When the thermal heating means are energized, the venting means conveniently cause the flow of air generated by the blower or fan to reach the duct means by a by-pass duct.

The blower or fan conveniently acts to cool the microwave generator (or so called magnetron), and may be additional to a further fan for forcing hot air over the thermal heating means and circulating the hot air through the first cavity.

In a preferred embodiment the grill unit surmounts the microwave oven unit, with both units being built into a standard kitchen unit structure. The duct means may lead from the back of the microwave oven unit, upwardly past the back of the grill unit, where the duct means communicate with the second cavity, over the top of the grill unit to a front exit above the grill unit.

An oven according to the invention will now be described by way of example with reference to the accompanying drawings, in which:

DESCRIPTION OF THE PREFERRED EMBODIMENTS

Figure 1:
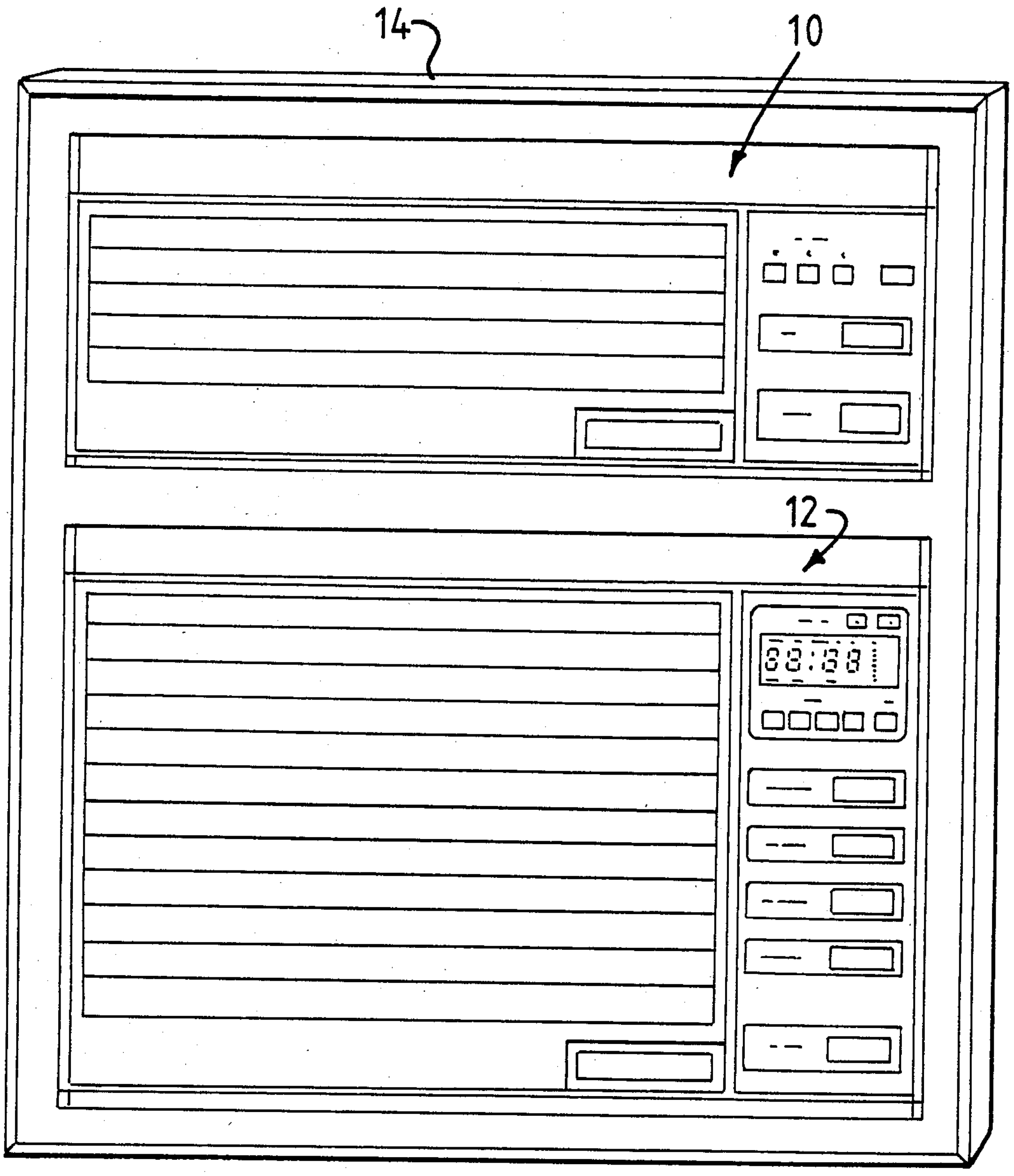
FIG. 1 is a front perspective view of the oven system.

The oven system comprises a grill unit 10 mounted on top of a microwave oven unit 12. Each unit has a front-opening door and a control panel with touch pads. The units 10 and 12 are surrounded by and built into a casing 14 which is dimensioned to fit within a standard kitchen unit structure or framework for receiving same 600 millimeters wide.

Figure 2:
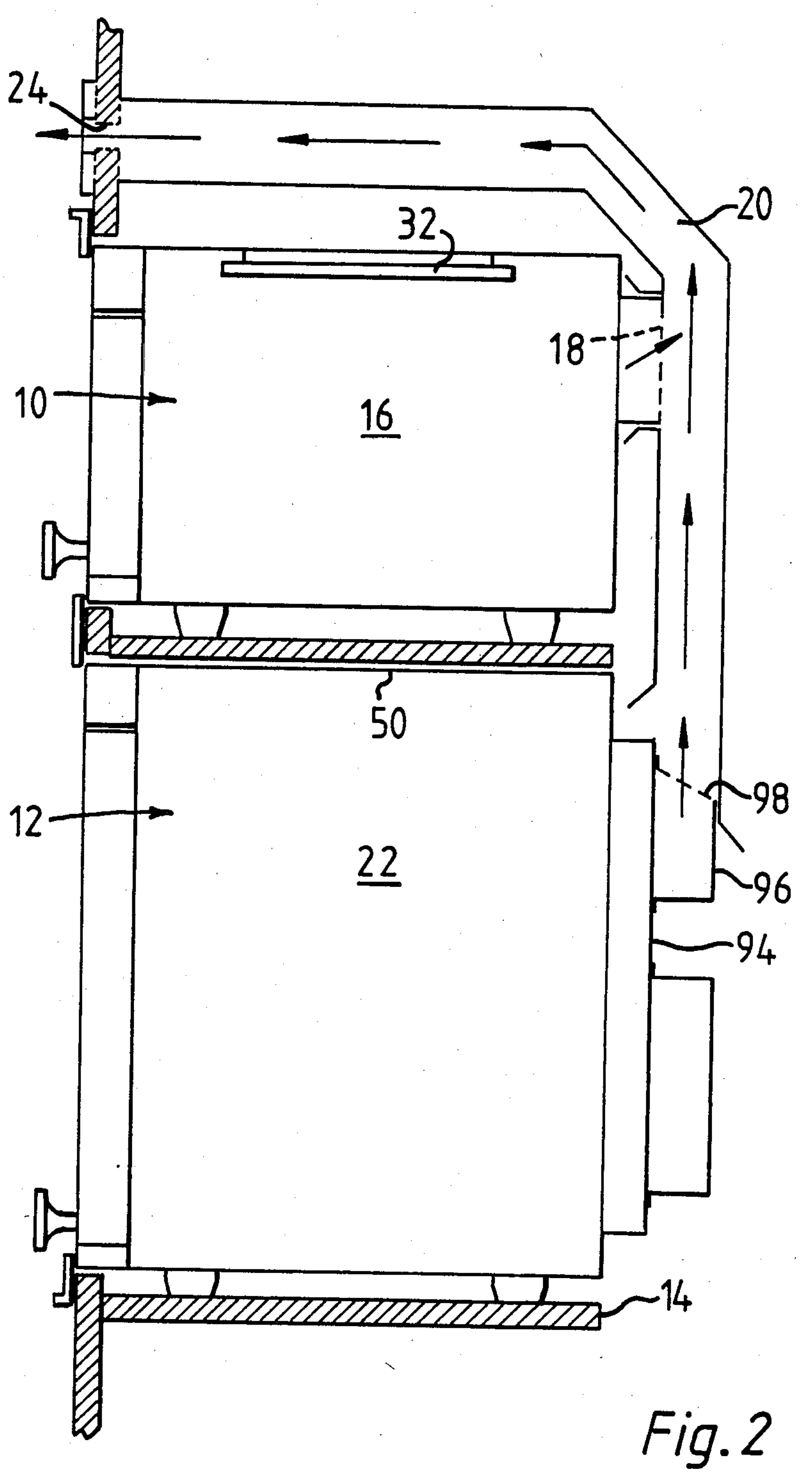
FIG. 2 is a sectional view through the oven system.

Referring to FIG. 2, the grill unit 10 has a cavity 16 at the rear of which is a vent 18 leading into duct means provided by a ventilation duct 20. The microwave oven unit 12 has a cavity 22 with a rear vent (30, FIG. 3) which communicates with duct 20.

The grill unit 10 has a grill element 32 for supplying radiant heat to the grill cavity 16. The microwave oven unit 12 is similar to that disclosed in our European Patent Specification No. 0099705 in that the unit 12 has a magnetron 46 (FIGS. 4 to 6) for supplying microwave power to the cavity 22 and thermal heating means for supplying thermal power to the microwave oven cavity 22. This thermal power is supplied in the form of convection heat as a result of hot air being forced over an electrical resistance heating element 91 (FIG. 5) by a fan (not shown).

The duct 20 leads upwardly from the back of the microwave oven unit 12, past the back of the grill unit 10 where it communicates with the vent 18, over the top of the grill unit 10 and thence to a front exit 24 above the grill unit 10.

Figure 3:
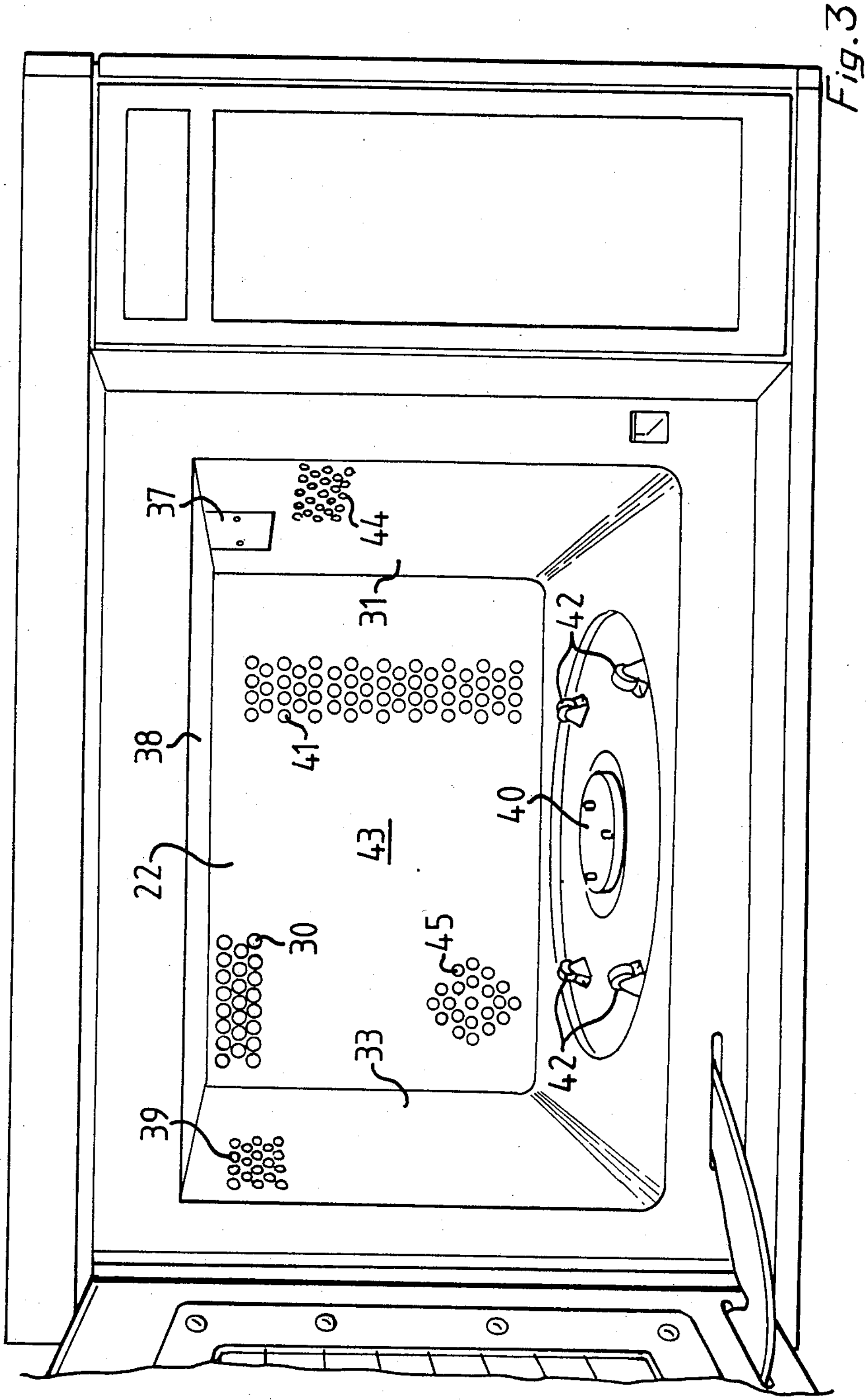
FIG. 3 is a view of a microwave oven unit of the system, with a door open to reveal the oven cavity.
Figure 6:
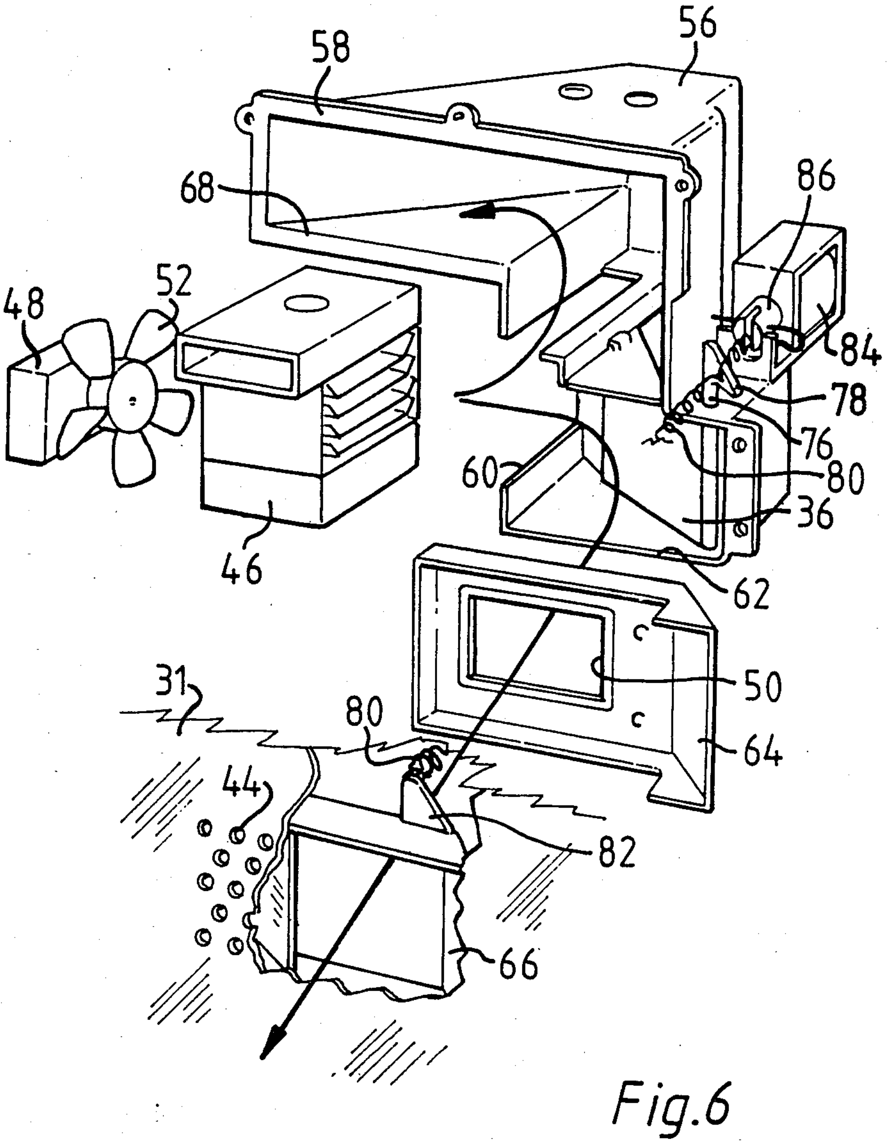
FIG. 6 is a perspective view with parts exploded, showing the air flow pattern of air blown over a magnetron of the microwave oven unit.

Referring to FIG. 3, the cavity 22 has two side walls 31, 33 and a top wall 38. The base of the cavity 22 has a central drive 40 for rotating a turntable (not shown), the underside of which is supported by four rollers 42. Reference 44 indicates a region of holes forming an air entrance port which is disposed in the side wall 31 and which is controlled by a movable shutter 36 (FIG. 6). Microwave energy is launched into the cavity 22 through a panel 37 in the side wall 31.

The side wall 33 has an apertured area 39 blanked off by a glass panel through which a cavity lamp shines when illuminated. A rear wall 43 of the cavity 22 has, at a location above an air outlet 45 to the fan, a series of holes forming the vent 30 for the exit of moisture from the cavity 22.

The rear wall 43 also has a series of apertures 41 forming an inlet for the forced flow of hot air which enters the cavity 22 through the apertures 41 and is drawn through the outlet 45 by the fan, before being re-heated by the electrical resistance heating element.

Figure 4:
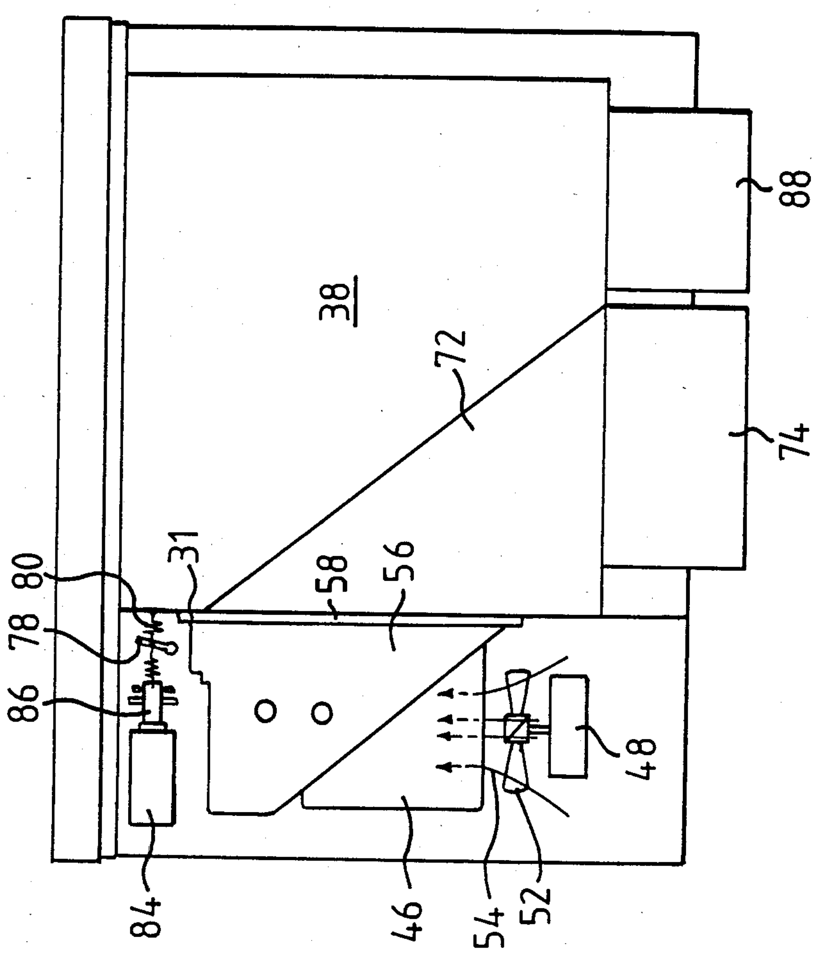
FIG. 4 is a plan view of the microwave oven unit.
Figure 5:
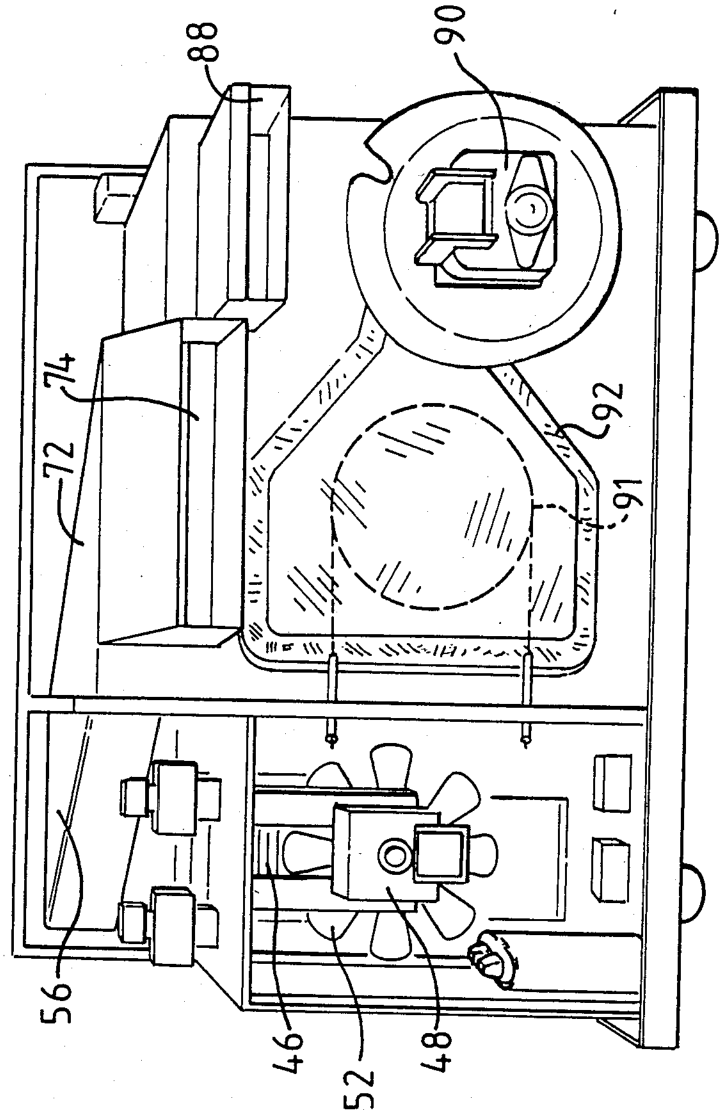
FIG. 5 is a rear view of the microwave oven unit.

As can be seen from FIGS. 4 and 5, the magnetron 46 and the blower motor 48 are located behind the control panel of the microwave oven unit 12, between the side wall 31 and an outer casing (not shown) of the oven unit 12. The blower motor 48 drives a blower 52 which has rotatable blading action to force a flow of cooling air over the magnetron 46. This flow of cooling air is indicated by arrows 54 in FIG. 4.

Attached to the exterior of the side wall 31 is a plastics housing 56 which has an edge flange 58 (best seen in FIG. 6) by which the housing 56 is attached to the exterior of the side wall 314.

The housing 56 has an inlet 60 positioned adjacent the magnetron 46 to receive air blown over the magnetron 46 by the blower motor 48. The housing 56 also has two outlets for this air: a first outlet 62 registers, through the intermediary of a shaped flexible seal 64, with an apertured member 66 directing the air to the air entrance port 44 in the side wall 31; a second outlet 68 registers with an inlet of a bypass duct 72 (FIGS. 4 and 5). The bypass duct 72 extends from its inlet above the side wall 31, over the top wall 38 to a rear outlet 74 (FIGS. 4 and 5).

The housing 56 provides a pivotal mounting for the shutter 36 which is shown in its normally open position in FIG. 6. The shutter 36 has upper and lower bearing pivots by which the shutter 36 is pivotally mounted in the housing 56 about a vertical pivot axis, and the upper bearing pivot 76 is extended upwardly to form a lever 78 which provides an anchorage for one end of a helical tension spring 80, the other end of which is attached to a lug 82 on the apertured member 66 fixed in the side wall 31. The spring 80 urges the shutter 36 to its open position illustrated in FIG. 6. In the open position of the shutter 36, air blown into the housing 56 by the blower motor 48 passes through the port 44 and thence into the cavity 22. A further flow of air passes through the second outlet 68 and thence into the bypass duct 72. This division of the airflow is shown by the arrows marked in FIG. 6.

A solenoid 84 mounted on the housing 56 has its movable core 86 connected to the lever 78, so that energisation of the solenoid 84 causes the shutter 36 to move to its closed position in which the shutter 36 covers an aperture 50 in the seal 64, so as to close the port 44. When the shutter 36 is in its closed position, air from the blower 52 is therefore prevented from entering the cavity 22, substantially all the air leaving the housing 56 through the outlet 68 and passing along the bypass duct 72.

The rear outlet 74 of the bypass duct 72 is best seen in FIG. 5. The outlet 74 is positioned beside a further ducted outlet 88 which surrounds the vent 30 in the rear wall 43. Hence, moisture venting from the cavity through the vent 30 issues from the outlet 88 at the rear of the oven unit 12. FIG. 5 also shows the rear of the motor 90 which drives the fan for forcing the hot air through the cavity 22, and the shaped housing 92 enclosing the electrical resistance heating element 91 for heating this air.

The rear of the oven unit 12 is closed by a rear panel 94 shown in FIG. 2. The panel 94 has a rearwardly projecting portion 96 enclosing the outlets 74 and 88. The portion 96 has an inclined, apertured, upper surface 98 through which air or moisture from the outlets 74 and 88 reaches the duct 20. The portion 96 has a width corresponding to the combined width of the outlets 74 and 88, i.e. more than half the width of the oven unit 12. The duct 20 and the vent 18 may have a similar width and the exit 24 is preferably a horizontally elongated slot extending over the grill unit 10 for substantially the whole width thereof.

As soon as the oven system is switched on, the blower motor 48 is energized and air is blown over the magnetron 46, even though the latter may not have been energised. The air enters the housing 56, part of the air passing through the port 44 and into the cavity 22 (since the shutter 36 is open), the remainder of the air passing along the bypass duct 72. This is an idling condition of the oven. If microwave only power is selected, the air flow regime remains the same as in the idling condition, i.e. as shown in FIG. 6, except that the air will be warmed as a result of passing over the energized magnetron 46. The air entering the cavity 22 vents the latter by entraining moisture which leaves the cavity through the vent 30. The moisture passes out of the outlet 88 and any tendency for the moisture to condense on the rear panel 94 is prevented by the flow of warm air issuing from the adjacent outlet 74 of the bypass duct 72.

If the electrical resistance heating element is energized to provide thermal power into the cavity 22, either alone or with the magnetron 46, the solenoid 84 is energized and in consequence the shutter 36 is closed. As a result, all the air delivered by the blower motor 48 is directed through the bypass duct 72 and thence into the duct 20. After a cooking operation has finished, the oven unit 12 reverts to the idling condition, and the air blown through the cavity 22 vents and cools the latter so that a subsequent cooking operation commences with the oven unit 12 in a cool condition. This is important for consistent and repeatable cooking results.

As explained, when the oven system is first switched on, the fan or blower 52 which cools the magnetron 46 in the microwave oven unit 12 will be driven and the shutter 36 of the microwave oven cavity will be open. The fan or blower 52 causes a flow of air to pass through the duct 20 and out of the exit 24, so as to vent both of the cavities 16 and 22. If microwave only power is selected, this venting of both cavities by the magnetron cooling blower 52 continues. If the thermal heating means of the microwave oven is switched on, the shutter 36 closes but the blower 52 continues to vent the grill cavity as a result of air passing through the by-pass duct 72 and along the duct 20. Hence, a summary of the operation is:

(1) When microwave oven unit 12 is 'on' on its own, venting will occur through duct 20 and exit 24.

(2) When grill unit 10 is 'on' on its own, the magnetron blower 52 in unit 12 is driven and as the shutter 36 is in the normally open position, cool air will vent through the duct 20 and thereby will drive the moisture being generated in the grill unit 10 out through exit 24.

When the grill finishes, an idling condition will remain until the grill is manually 'switched off'. This will in turn de-energized the magnetron blower 52 in the oven unit 12 below.

(3) When both units 10 and 12 are 'on' in a 'Hot Air' condition, the resultant moisture that is being liberated in the microwave oven unit 12 will be cooled down by the magnetron blower air (that is being directed over the top of the microwave cavity through the by-pass duct 72) and this air will rise through duct 20 and will also drive off the moist air that is being liberated by the grill unit 10 and both amounts of hot moist air will vent through the exit 24.

In this condition, if the microwave unit 12 finishes before the grill unit 10 then the oven system will stay in an idling condition—but if the unit 12 is manually switched 'off' the magnetron blower will remain on until the grill unit 10 finishes and is manually switched off. If, however, the grill unit 10 finishes first, the microwave unit 12 continues to vent normally as in (1) above.

Having disclosed my invention, what I claim as new and to be secured by Letters Patent in the United States is:

1. An oven system comprising a microwave oven unit having a first cavity, a microwave generator for supplying microwave power to said first cavity and thermal heating means for supplying thermal power to said first cavity, and a grill unit having a second cavity and a grill element for supplying thermal power to said second cavity, said microwave oven unit having a blower or fan capable of venting the first cavity, and duct means leading from said microwave oven unit, communicating with said second cavity and exiting to the surroundings, whereby said blower or fan causes air to flow from said microwave oven unit and along said duct means so as to entrain air from said second cavity and thereby vent the latter, means for activating the oven system which activates said blower or fan to generate a flow of air through said duct means, said first cavity being provided with a movable shutter which is movable between an open position in which the air from said blower or fan is blown into said first cavity and thence through a vent in a rear wall of said first cavity into said duct means, and a closed position in which air from said blower or fan is prevented from reaching said first cavity, said shutter being in the open position whenever the oven system is activated except when the thermal heating means are energized when said shutter is in its closed position.

2. An oven system according to claim 1, wherein said grill unit surmounts said microwave oven unit.

3. An oven system according to claim 2, wherein said duct means lead from the back of said microwave oven unit, upwardly past the back of said grill unit, where said duct means communicate with said second cavity, over the top of said grill unit to a front exit disposed above said grill unit.

4. An oven system according to claim 1, wherein said blower or fan communicates with said microwave generator via air passage means for cooling same.

5. An oven system according to claim 1, wherein a by-pass duct extends from adjacent the magnetron to said duct means to provide a path for air from said magnetron to said duct means when said shutter is in its closed position.

6. An oven system according to claim 5, wherein said by-pass duct is open at all times so that when said shutter is in its open position a proportion of air blown over said magnetron by said blower motor reaches said duct means through said by-pass duct.

* * * * *